United States Patent [19]

Olsen

[11] Patent Number: 5,261,238

[45] Date of Patent: Nov. 16, 1993

[54] INTERNAL COMBUSTION STEAM ENGINE

[76] Inventor: Leonard E. Olsen, P.O. Box 56, Weldon, Saskatchewan, Canada, S0J 3A0

[21] Appl. No.: 802,407

[22] Filed: Dec. 4, 1991

[30] Foreign Application Priority Data

Dec. 20, 1990 [CA] Canada .................... 032794

[51] Int. Cl.$^5$ .............................................. F02B 41/06
[52] U.S. Cl. ..................................................... 60/620
[58] Field of Search ............... 60/620, 622; 123/25 N, 123/25 C, 310, 527, 556, 557

[56] References Cited

U.S. PATENT DOCUMENTS

| 865,213 | 9/1907 | Schaeffers | 60/622 |
| 899,625 | 9/1908 | Scheider et al. | 60/598 |
| 961,059 | 6/1910 | Abbott | 60/622 |
| 1,349,515 | 8/1920 | Lombard | 123/25 C |
| 1,904,070 | 4/1933 | Morgan | 60/620 |
| 2,827,892 | 3/1958 | McDuffie et al. | 123/310 |
| 4,020,810 | 5/1977 | Baverstock | 123/527 |
| 4,783,966 | 11/1988 | Aldrich | 60/622 |

FOREIGN PATENT DOCUMENTS

| 3326862 | 2/1985 | Fed. Rep. of Germany | 123/25 C |
| 244804 | 12/1925 | United Kingdom | 60/620 |
| 309009 | 4/1929 | United Kingdom | 60/622 |
| 2000224 | 1/1979 | United Kingdom | 60/620 |

Primary Examiner—Michael Koczo
Attorney, Agent, or Firm—Dressler, Goldsmith, Shore & Milnamow, Ltd.

[57] ABSTRACT

The invention is an internal combustion steam engine comprising a conventional internal combustion engine, provided with a means for injecting water into power cylinders immediately after combustion of a fuel/air charge in the power cylinders such that the heat produced by the combustion vaporizes the water into steam and increases the force produced by the power stroke. The invention also discloses the use of compound cylinders which are powered by the exhaust gases and steam from the power cylinders. Also provided is an exhaust system wherein the exhaust gases and steam are utilized to heat the intake air and fuel and wherein the steam is cooled and condensed into water with absorbed pollutants and the remaining exhaust gases exit the heat exchanger to the atmosphere at substantially atmospheric temperature.

3 Claims, 4 Drawing Sheets

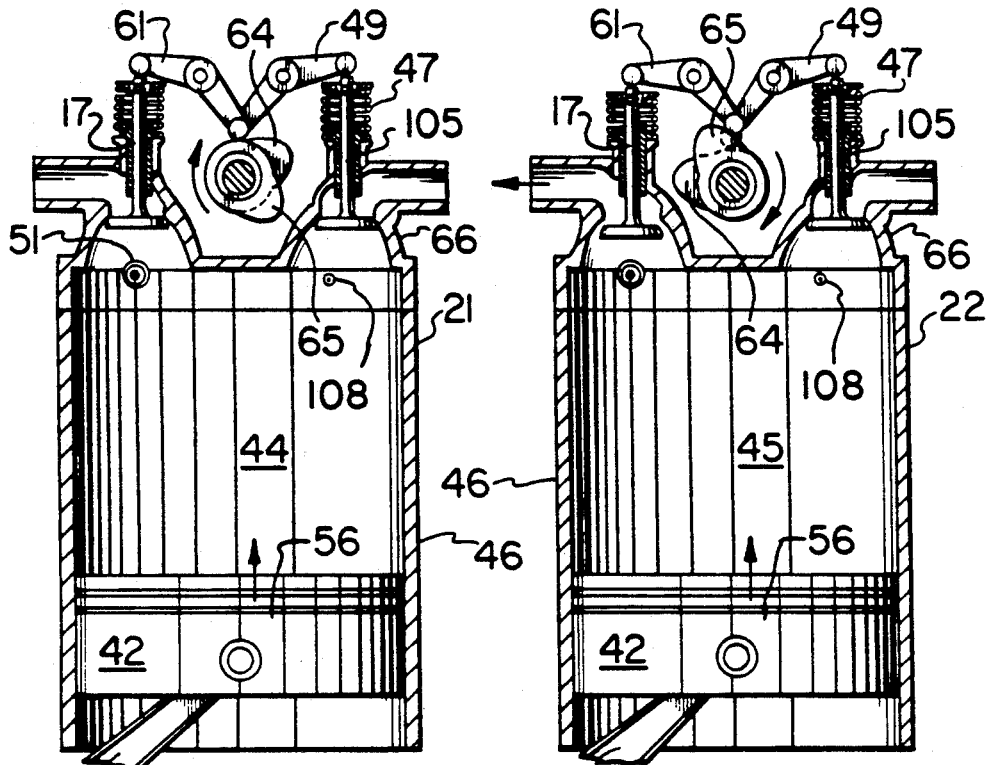
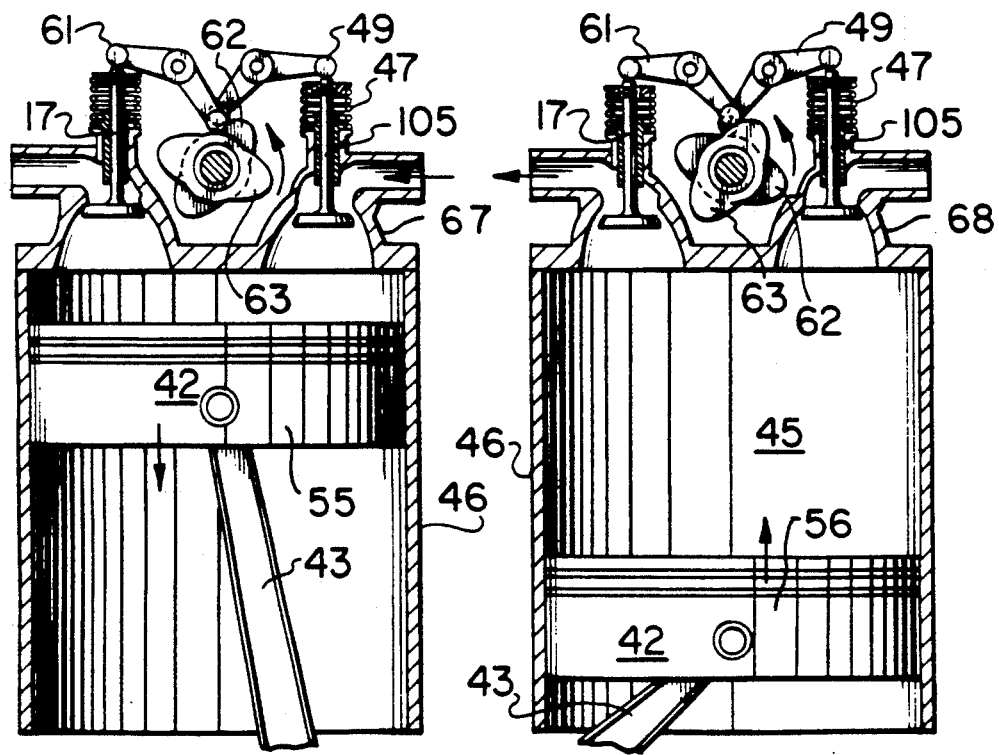

INTERNAL COMBUSTION STEAM ENGINE

The invention relates to an internal combustion engine. More particularly, this invention relates to an internal combustion engine which also uses steam as a power source. The steam, which provides most of the engines power, is generated in the cylinder heads in which the fuel/air charge is combusted.

BACKGROUND OF THE INVENTION

In a traditional steam engine a cylinder is provided in which a piston is moved backwards and forwards by the pressure of steam applied alternately to the two faces of the piston. It is also known that steam exits the cylinders with unused energy. Prior engines have utilized 2, 3, or even 4 cylinders with pistons connected to a common shaft. These are arranged such that the steam leaving the first cylinder enters and powers the next cylinder, which is of larger diameter and similarly passing thereafter to larger diameter cylinders and finally escaping into a condensing chamber or the atmosphere. However, even compound steam engines utilize only a portion of the energy available.

With respect to internal combustion engines, and as an example four stroke high compression gasoline engines, despite numerous attempts at improving the conversion ratio of heat energy into mechanical energy, much of the energy is wasted. While the internal combustion gasoline engine is more efficient than a steam engine, it only transforms about 30% of its heat energy into mechanical energy. This is in part due to losses in cooling the engine and through the exhaust. Further, internal combustion engines create a large amount of pollutants. Finally, conventional internal combustion engines, due to the thermodynamic properties of the combustion mixture of fuel and air, are not capable of creating high power or torque at low rpms. Thus, when pulling a heavy load up a hill a vehicle driver must shift to a lower gear to raise the rpms.

Possible benefits derived from the use of water in conjunction with internal combustion engines have been recognized. There has been experimentation with the concept of water injection into combustion air. However, these experiments have been only partially successful since, when water is injected into the combustion air it interferes with the ignition and combustion of the fuel/air charge in the cylinder head.

It is therefore an object of this invention to provide an internal combustion engine having a greater heat energy/mechanical energy conversion ratio than is presently available in known engines.

A further object is to provide an engine which will produce less harmful pollutants than are produced in conventional internal combustion engines.

A still further object is to create an engine that is able to produce high power and torque at lower rpms than in conventional internal combustion engines.

Finally, it is an object of the invention to create the desired engine which is built from standard engine parts with little modification.

The invention achieves these objectives by providing an engine which combines desirable qualities of the internal combustion engine with desirable qualities of the steam engine. The steam, which provides most of the engines' power, is generated in the cylinder head after combustion takes place as the piston is forced downwards. As soon as the fuel/air charge is combusted an optimal amount of water is injected into the cylinder head. The water which is heated to the same temperature as that of the combustion charge changes to superheated steam. The heat required is provided by the combustion charge, causing the combustion gases to decrease in volume and temperature. The increased volume of the steam is greater than the decreased volume of the combustion gases. Therefore, greater power is created by the heat transfer. The steam continues to expand with reduced pressure during the remainder of the power stroke.

The vaporization of the water results in a decrease in temperature in the combustion gasses. The injected water cools the cylinder head thus reducing the possibility of the engine overheating. To help ensure that the engine will not overheat a sensor is used whereby the engine is stopped if the water supply fails. A further benefit of cooling the combustion charge immediately after combustion, is that the production of nitrogen oxides are reduced, since the time during which the high temperatures required for production of those pollutants is maintained in the cylinder heads, is reduced.

The power of the internal combustion steam engine depends on the total heat of the combustion charge, and not on the compression ratio of the cylinders. Therefore a large diameter cylinder which burns a low octane, low heat combustion charge can produce the same power as a smaller diameter cylinder with a high compression ratio, which burns a high octane fuel. Therefore, the same power can be produced at a lower initial temperature.

Finally, the internal combustion steam engine allows for the generation of high power and torque at low engine speeds due to the increased power generated by the expansion of the water/steam. The mechanical power produced by a piston is dependant upon the length of stroke of the piston, and the mean, effective pressure of the gases on the face of the piston. In conventional high speed, high compression engines most of the power is generated in the first inch of the power stroke of the pistons. High speed is therefore necessary to create high power. The internal combustion steam engine which is designed as a slow running, long stroke engine will produce more power at low rpms and produce less vibrations than high speed engines.

Another important feature of the internal combustion steam engine is the importance of transferring substantially all of the heat from the exhaust gases to the combustion air.

Finally a plurality of compound cylinders also helps to use a greater proportion of the steam energy.

SUMMARY OF THE INVENTION

Accordingly, the present invention provides an internal combustion steam engine including one or more cylinders with pistons therein pivotally connected to a crankshaft, which comprises: at least one power cylinder; said power cylinder including a means for injecting a mixed fuel/air charge into said power cylinder; and a means for igniting said fuel/air charge in said power cylinder; and further including a means for injecting water into said cylinder immediately after combustion of said fuel/air charge, such that, when in operation, heat produced by combustion of said fuel air charge vaporizes said water into steam, thereby providing additional force to drive said piston.

The invention further seeks to provide two stroke compound cylinders which are, when in operation, powered by exhaust gases including steam from said power cylinders.

Also provided is an internal combustion steam engine as described above which further includes exhaust means whereby, when in operation, exhaust gases and steam from said power cylinders are cooled by transferring their heat energy to the incoming combustion air thereby condensing said steam to water containing absorbed pollutants. The water and absorbed pollutants may either exit into the atmosphere or be collected and stored for periodic deposit in centrally located disposal sites. Since the exhaust gases leave the engine at substantially atmospheric temperatures the fire hazard is eliminated.

According to a preferred embodiment of the invention, the power cylinders are high compression four stroke internal combustion cylinders with water injection nozzles therein, and the compound cylinders are two stroke cylinders with larger diameters than the diameter of the power cylinders.

Most of the parts utilized in the engine are conventional internal combustion engine parts. The engine can be of any size with any number of cylinders and can produce any amount of desired horsepower. It can also be designed to utilize different fuels such as propane or natural gas. The efficiency of combustion is improved by the use of two spark plugs in each power cylinder. Further, in a preferred embodiment, the engine is well insulated against heat loss thereby raising the efficiency of the engine and eliminating the fire hazard.

A turbocharger is used in the design of this engine for more than the obvious reasons of creating more power from the engine. It also is used to transfer some of the heat energy from the exhaust gases to the incoming combustion air. This engine design may contain enough compound cylinders so that the remaining heat energy in the exhaust gases can be reduced to atmospheric temperature with the heat energy used by the turbocharger, and the evaporation and heating of the liquid fuel; but without having to make the primary heat exchanger too large and bulky.

The primary heat exchanger is used to re-cycle the remaining heat energy in the exhaust gases, and transfer that heat to the incoming combustion air, where it can be utilized in the engine to produce usable power.

This engine will achieve fuel efficiency that will be much greater than that of any diesel engine. Further, there will be no un-burned hydrocarbon gases in the exhaust gases, the production of NOx will be greatly reduced, and most of the NOx produced probably will be absorbed in the water formed by the condensed steam. The conversion ratio of this engine will also be very high.

BRIEF DESCRIPTION OF THE DRAWINGS

FIG. 2 is a section taken along the line 2—2 of FIG. 1;

FIG. 3 is a section taken along the line 3—3 of FIG. 1;

FIG. 4 is a section taken along the line 4—4 of FIG. 1;

FIG. 5 is a section taken along the line 4—4 of FIG. 1;

DETAILED DESCRIPTION OF THE INVENTION

Figure 1:
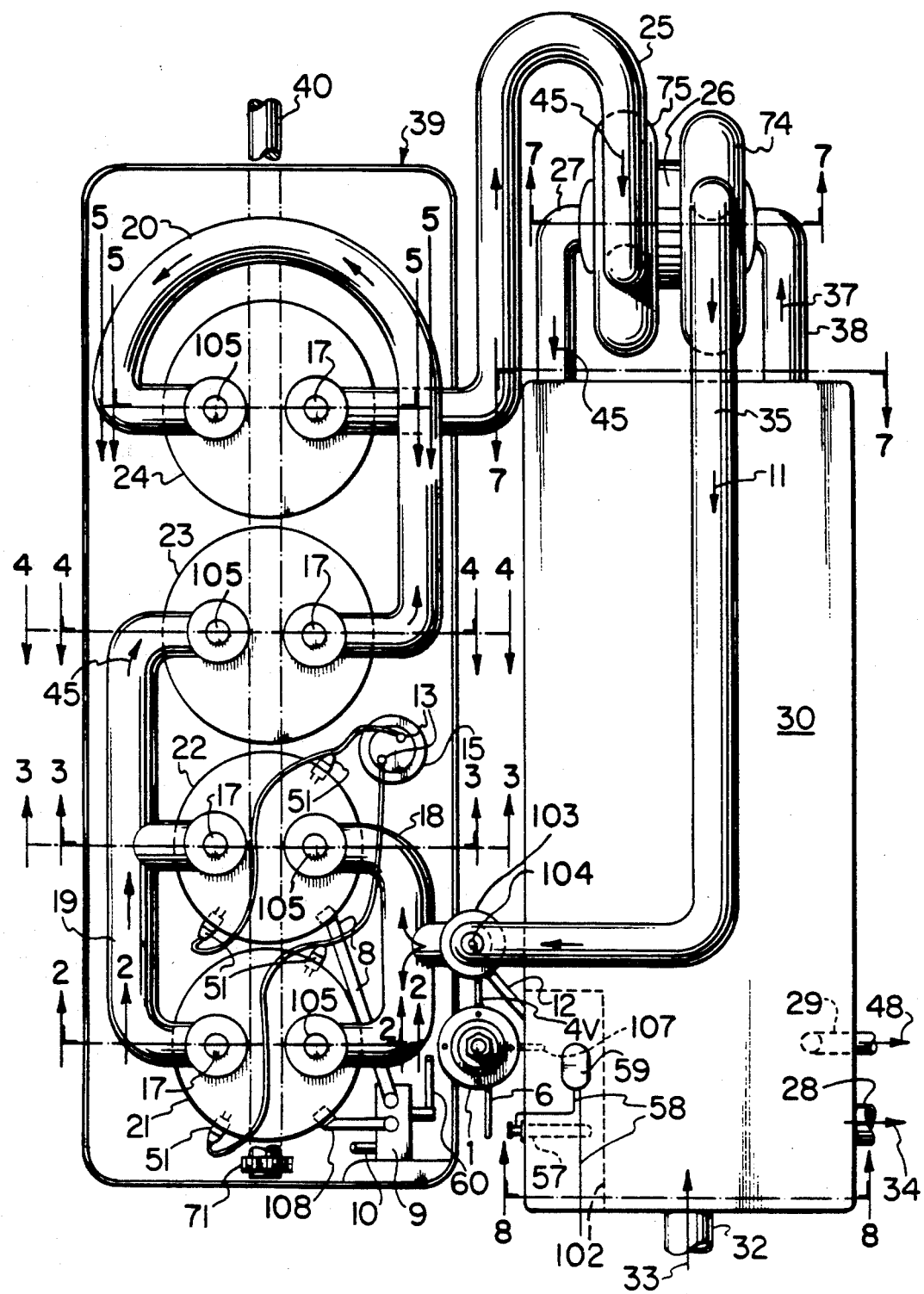
FIG. 1 is a plan view of the cylinder block and exhaust system of the internal combustion system engine.

In FIG. 1 the engine has four cylinders. The camshaft and it's gear, the timing chain, the valve springs and the rocker arms, are not shown for less complication of the drawing FIG. 1. Two of the cylinders (21, 22) are power cylinders, and two (23, 24) are compound cylinders. Each of the power cylinders (21, 22) has the same size bore. The first compound cylinder (23) has a larger bore than the power cylinders, and the second compound cylinder (24) has a larger bore than the first compound cylinder (23). All the cylinders have the same length of stroke, which may be considerably longer than typically used in conventionally internal combustion engines. The cylinder heads of the power cylinders (21, 22) are known, with the exception of a water injection nozzle 108 contained therein.

The valve springs (47), rocker arms (49) and (61) are of conventional construction.

In FIG. 1 the cylinders are shown within the crankcase (39) wherein the engine pistons (42) drive the crank shaft via connecting rods (43). The cylinders are marked generally as (46). In FIGS. 2 through 5 (55) is a piston that is moving down in it's cylinder, away from the cylinder head. (56) are pistons that are moving up, towards the cylinder head.

The pistons (42) and connecting rods (43) in the power cylinders are of conventional design. The pistons of the two power cylinders (21) and (22) are the same diameter. The piston in cylinder (23), which is the first compound cylinder, is larger in diameter than the pistons in the power cylinders (21) and (22).

The piston in the second compound cylinder 24 may be larger in diameter than the piston in cylinder 23. The pistons 42, connecting rods 43 and wrist pins (not shown) in the compound cylinders may be constructed from composite plastic materials reinforced with carbon fibers. Similarly, the valves 105 in the compound cylinders may be constructed from heat resistant plastics.

The preferred embodiment herein described is designed for use with conventional liquid hydrocarbon fuels. The invention also employs the carburetion system described in Canadian Patent 1,194,373 in which fuel is combined with combustion air in a gaseous state to form a stochiometric, homogeneous fuel/air mixture. Fuel is fed into a hydrocarbon proportioner (1) from a fuel pump (not shown) through a hydrocarbon fuel supply conduit (6) in which a pressure regulator (not shown) is employed.

From the hydrocarbon proportioner (1) a stochiometric amount of fuel is fed into a vaporizing and heating chamber, sometimes referred to as a secondary heat exchanger 102 through a conduit (107). There are two heat exchangers, primary (30) and the secondary (102). The primary heat exchanger 30 which is shown very large and the secondary heat exchanger 102 is contained within the primary heat exchanger 30.

The Internal Combustion Steam Engine of the invention will operate without any heat exchangers at all. However, the conversion ratio of heat energy into mechanical energy would be considerably less; and the heat energy produced would be less.

This Internal Combustion Steam Engine is designed to use a fuel efficient carburetion system which requires a fuel vaporizing chamber containing a glow plug such as the secondary heat exchanger 102. If the said engine was designed to use a conventional carburetion system the heat exchanger 102 would not be required.

In conventional internal combustion engines it is desirable to keep the combustion air at as low a temperature as possible. That is why that when a turbocharger is used, usually a heat exchanger is inserted between the compressor section and the carburetor, to remove the heat of compression added by the compression of the air. The higher the temperature of the combustion air as it enters the engine cylinders the less it will expand when the fuel/air charge is combusted and the pressure on the piston face will be less, lowering the engine's output.

The Internal Combustion Steam Engine relies only on the total heat content of the combustion charge for it's total power production. The greater the heat content of the combustion charge, the more water that can be vaporized creating a greater volume of steam; and the steam provides most of the power the said engine produces. Accordingly, hot pressurized combustion air 11 is conducted to the carburetor inlet through conduit 35 from the compressor section of a turbo 26.

The primary heat exchanger (30) is designed to transfer heat energy that is not used in powering the turbocharger and vaporizing the liquid hydrocarbon fuel; to the in-coming combustion air. The exhaust gas that leaves the heat exchanger will be at substantially atmospheric temperature. The fuel is heated and vaporized in vaporizing and heating chamber (102) and is then fed at a pressure that is above atmospheric through a conduit (12) into a homogeneous mixing chamber (103). An air volume sensor 104 is positioned above the homogeneous mixing chamber (103). A conduit (4V) is provided between the hydrocarbon proportioner (1) and the air volume sensor (104), for conveying vacuum control signals from the air volume sensor (104) to the hydrocarbon proportioner (1). In the secondary heat exchanger (102), a glow plug (57) is provided for vaporization of the fuel when starting the engine and any time that the temperature of the secondary heating exchanger (102), drops below normal operating temperature. Use of the glow plug (57) is controlled by a thermostat (59) which is mounted on the surface of the secondary heat exchanger (102). The electrical energy for the glow plug 57 is supplied through an electrical wire (58). Once the engine is warm, the liquid fuel is vaporized using heat from the exhaust gases.

From the homogeneous mixing chamber (103) the fuel/air charge is fed into the power cylinders through an intake manifold (18) connected to the intake ports and valves (105) in the power cylinders (21, 22). The power cylinders (21, 22) each contain two spark plugs (51), for igniting the fuel/air charge. A distributor (15) contains outlets for two high tension cables (13). Each cable supplies the two plugs (51) in one of the power cylinders (21, 22).

Each of the two power cylinders (21, 22) contains a water injection nozzle (108) in its cylinder head. The nozzles are connected by water conduits to a water injection pump (9), which is supplied with water from an inlet supply conduit (10). The water injector pump may be similar to known diesel fuel pumps although it would have to be made of noncorrosive materials. Immediately after a fuel/air charge is combusted in a power cylinder head and before there is significant movement of the piston in the power cylinder, the water injection pump (9) injects a controlled amount of water into the cylinder head through the water nozzle (108).

As will be apparent to those skilled in the art, the timing of the diesel type water injection pump will be controlled by running the pump by gears from the crank shaft (not shown) in a known manner.

The amount of water injected is controlled by a volume flow control lever (60). This lever (60) is connected by suitable linkage (not shown) to the throttle of the engine and a valve on the pump (9).

Upon combustion of the fuel/air charge and vaporization of the injected water, the power cylinder piston is driven on its power stroke. Subsequently, the exhaust gases including steam exit the cylinder through exhaust ports having open exhaust valves (17). The exhaust valves (17) are designed to open as late as practicable during the power stroke.

Hot pressurized combustion air 11 is conducted to carburetor inlet through a conduit (35) from the compressor section of the turbo (26).

The exhaust gases exit through the exhaust ports into an exhaust manifold (19) and are conducted to the intake port of the first compound cylinder (23). A conduit 20 conducts exhaust gases mixed with steam, from the exhaust port of compound cylinder (23) to the intake port of the compound cylinder (24).

The compound cylinders (23, 24) have practically zero clearance between the piston tops and the bottom of the cylinder heads when the piston is at top dead centre.

The piston of the first compound cylinder (23) is driven on its power stroke each time exhaust gases are supplied from one of the power cylinders (21, 22). During the exhaust stroke of compound cylinder (23) the exhaust gases flow through its exhaust port and valve (17) to the intake valve (105) of the second compound cylinder (24). On the exhaust stroke of the second compound cylinder (24) the exhaust gases exit through its exhaust port and valve (17) into an exhaust gas conduit (25) that conducts exhaust gases from the exhaust port of the compound cylinder (24), to the inlet of the turbine (75) of a turbocharger (26).

The power cylinders are four stroke cylinders and the compound cylinders are two stroke. There is one power stroke from each power cylinder (21, 22) and two power strokes from each compound cylinder (23, 24) for each two revolutions of the crankshaft (40). Since there are differently timed power strokes from each compound cylinder for each revolution of the engine crankshaft, an unconventional camshaft is required. As discussed in detail below.

The stroke sequence of the engine is shown in the following chart.

| Crankshaft revolutions | Compound cylinder #24 | Compound cylinder #23 | Power cylinder #22 | Power cylinder #21 |
| --- | --- | --- | --- | --- |
| one | exhaust power | power exhaust | exhaust intake | compression power |

-continued

| Crankshaft revolutions | Compound cylinder #24 | Compound cylinder #23 | Power cylinder #22 | Power cylinder #21 |
|---|---|---|---|---|
| | exhaust | power | compression power | exhaust |
| two | power | exhaust | power | intake |

The exhaust gases mixed with steam also drive the turbo charger (26). The exhaust and combustion air turbines in the turbocharger may be constructed from heat resistant plastic.

From the turbocharger (26) the exhaust gases (45), leave via a conduit (27), to enter the primary heat exchanger (30). A portion of the exhaust gases (45) pass directly to the secondary heat exchanger (102) as discussed below. Heat contained in the exhaust gases (45) is transferred to incoming combustion air (33) in the primary heat exchanger (30).

Small conduits 72 on a vertical plane to conduit (27) are fastened to conduit (27), and conduct a portion of the exhaust gases (45) to the bottom of the vaporizing and heating chamber (102). Heat exchanger combustion air tubes 73 which conduct the combustion air (33) longitudinally through the heat exchanger (30), from the inlet conduit (32) to the exit conduit (38). The combustion air 33 is heated by exhaust gases (45) which pass transversely over the tubes (73), to the conduit (28). The heated combustion air is designated as (37). The compressor turbine of the turbocharger (26) is designated 74 and the exhaust gas turbine of the turbocharger (26) is designated 75.

The steam portion of the exhaust gases (45) is condensed to water in the primary heat exchanger (30) and cooled. The resultant water, with absorbed pollutants (48), exits the heat exchanger (30) via a water conduit (29) and enters the atmosphere, or is collected and stored for environmental purposes. Remaining exhaust gases (34) exit the heat exchanger (30) via an exhaust gas conduit (28) to the atmosphere at a temperature that is substantially atmospheric.

The combustion air (33), which enters the primary heat exchanger (30) through a conduit (32) from an air cleaner (not shown), receives the heat contained in the exhaust gases in the primary heat exchanger (30). The heated combustion air (37) leaves the heat exchanger (30) via the conduit (38) and enters the inlet port of the compressor turbine (74) and is further pressurized and heated while passing through the turbocharger (26). The resultant hot, pressurized air (11) is conducted to the carburettor via a further conduit (35). The air (11) then enters the homogeneous mixing chamber (103) where it is mixed with the vaporized and heated hydrocarbon fuel to create the fuel/air combustion charge that is substantially at a stoichiometric fuel/air ratio and substantially a homogeneous mixture. The fuel air mixture 44 is compressed in cylinder (21), by the piston (42).

Also shown in the drawings are the following components. Exhaust valve rocker arms are shown as (61). Compound cylinder intake valve cam lobes are shown as (62). Compound cylinder exhaust valve cam lobes are shown as (63). Power cylinder intake valve cam lobes are shown as (64); power cylinder exhaust valve cam lobes are shown as (65). Heads for the power cylinders are shown as 66. The head of compound cylinder (23) is shown as 66 and the head for compound cylinder (24) is shown as 68. A flange for mounting the large sprocket on the cam shaft is shown as 69. The end of the camshaft that faces the same way in the engine as the crankshaft (40) where the flywheel is attached is shown as 69; and (71) is a small camshaft drive sprocket on the end of the crankshaft.

Figure 6:
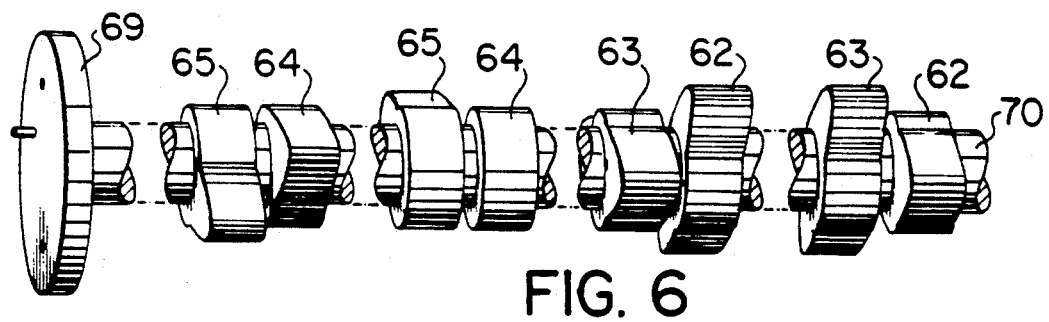
FIG. 6 is a perspective view of the camshaft, shown in sections showing the cam lobes for the power cylinders and the compound cylinders.

The camshaft shown in FIG. 6 rotates clockwise at one half of the speed of the crankshaft. It is driven like any conventional overhead camshaft with a chain that joins a small sprocket on the crankshaft with a sprocket that is twice as large fastened to the flange (69). The camshaft lobes are divided into four sections: (1) section EE which operates the valves of power cylinder (21) as shown in FIG. 2; (2) section FF which operates the valves in the power cylinder (22), as shown in FIG. 3 both of these sections are viewed from the end of the engine that contains the small timing chain drive sprocket (71); (3) section HH which operates the valves in the compound cylinder (23) as shown in FIG. 4; and (4) the section GG which operates the valves of the compound cylinder (24) as shown in FIG. 5. (The sections HH and GG being viewed from the opposite end of the engine (the flywheel end (40) from the sections EE and FF, which are viewed from the end of the engine that contains the small camshaft drive gear 71, and therefore the camshaft as shown in FIGS. 4 and 5 rotate counter clockwise as the arrows in FIGS. 4 and 5 show). The sections HH and GG operate the valves for the compound cylinders (23) and (24), which are two stroke cylinders, therefore all of the cams that operate the valves of the compound cylinders have two lobes for each cam. This is necessary because the camshaft turns at one half the speed of the crankshaft. The shape of these lobes are shown in FIGS. 4 and 5.

The percentage of the camshaft rotation that both the exhaust valves and the intake valves of the power cylinders are open will be similar to conventional gasoline burning engines operating at the same R.P.M. as the Internal Combustion Steam Engine.

The exhaust valves of the power cylinders will not begin to open until the respective pistons have travelled about three quarters of the travel to bottom dead center.

The degrees of camshaft rotation that both the exhaust valves and the intake valves of the compound cylinders are open will be less than that of the power cylinders; however, it is difficult to quote any specific number of degrees unless the R.P.M. that the Internal Combustion Steam Engine is designed to operate at, is known.

FIGS. 2 through 8 will now be described in greater detail.

The cutting plane AA which passes through the center of the cylinder (21) and produces the sectional view AA as shown in FIG. 2 is viewed from the end of the engine that contains the small camshaft drive sprocket (71). The camshaft lobes of Section EE designated (64) and (65), and the valve springs (47) and the rocker arms (49) and (61) are also shown as FIG. 2. The cam lobes shown by the section EE are also viewed from the end of the engine that contains the small camshaft drive sprocket (71).

The cutting plane BB which passes through the center of the cylinder (22) as shown in FIG. 3, is viewed from the end of the engine that contains the small drive sprocket (71). The camshaft lobes of section FF designated (64) and (65), and the valve springs 47 and the rocker arms (49) and (61) are shown on FIG. 3. The cam lobes shown by section FF are also viewed from the end of the engine that contains the small camshaft drive sprocket (71).

The cutting plane CC which passes through the center of the cylinder (23) as shown in FIG. 4, is viewed from the end of the engine that contains the crankshaft end (40). The camshaft lobes of section HH designated (62) and (63), and the valve springs (47) and the rocker arms (49) and (61) are shown on FIG. 4. The camshaft lobes (62) and (63) as shown in FIG. 4, are viewed from the end of the engine that contains the crankshaft end (40); therefore, the cam lobes (62) and (63) will appear to rotate counter clockwise as shown in FIG. 4.

The cutting plane DD which passes through the center of cylinder (24) as shown in FIG. 5, is viewed from the end of the engine that contains the crankshaft end (40). The camshaft lobes of section GG designated (62) and (63), and the valve springs (47) and the rocker arms (49) and (61) are shown on FIG. 5. The camshaft lobes (62) and (63) as shown in FIG. 5, are viewed from the end of the engine that contains the crankshaft end (40); therefore, the cam lobes (62) and (63) will appear to rotate counter clockwise as shown in diagram FIG. 5.

Figure 8:
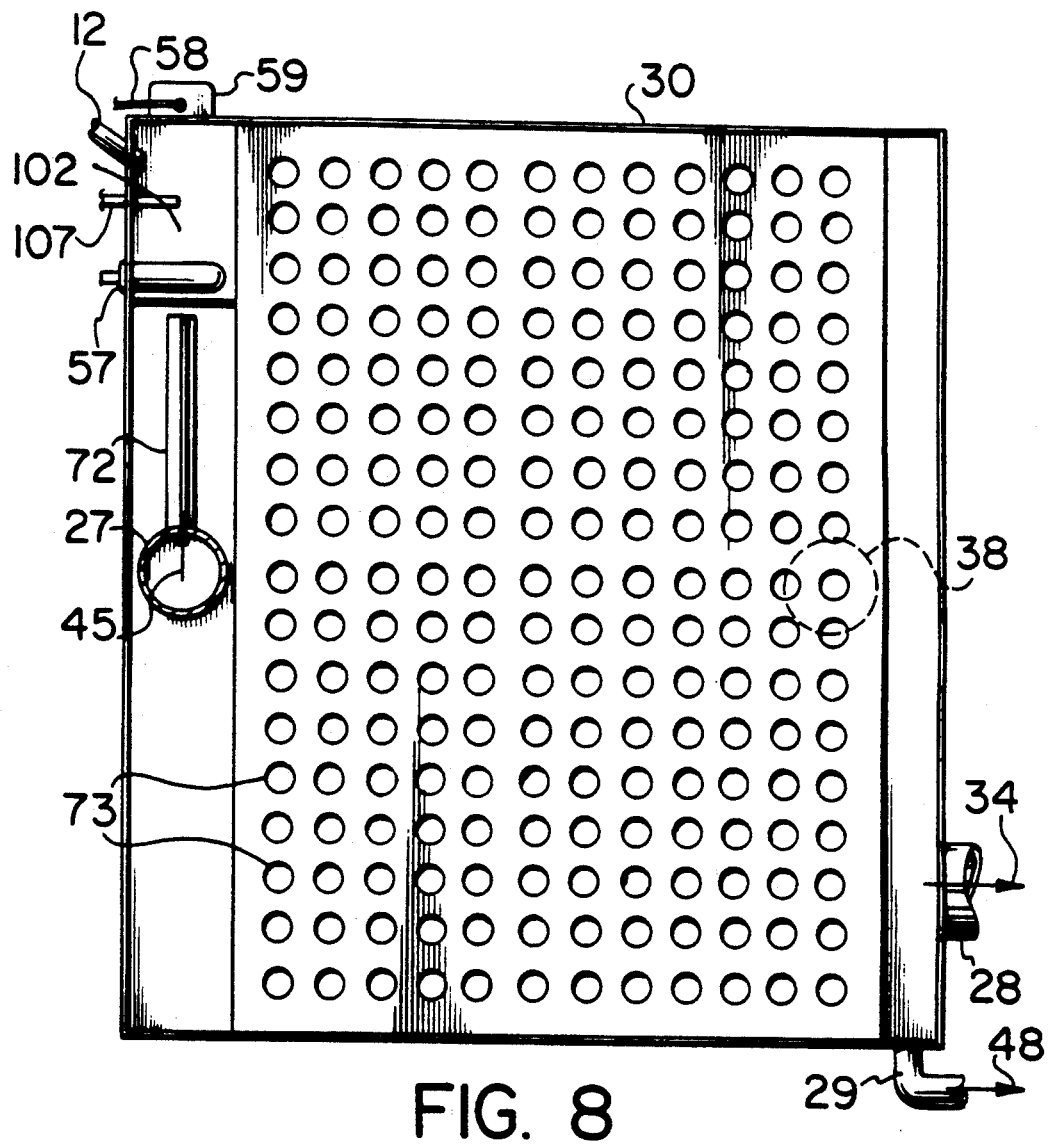
FIG. 8 is a section along line 8—8 of FIG. 1 showing the primary heat exchanger 30.

The cutting plane II removes the end of the primary heat exchanger (30), which is viewed from the end of the engine that contains the small camshaft drive sprocket (71), and is shown in FIG. 8.

Figure 7:
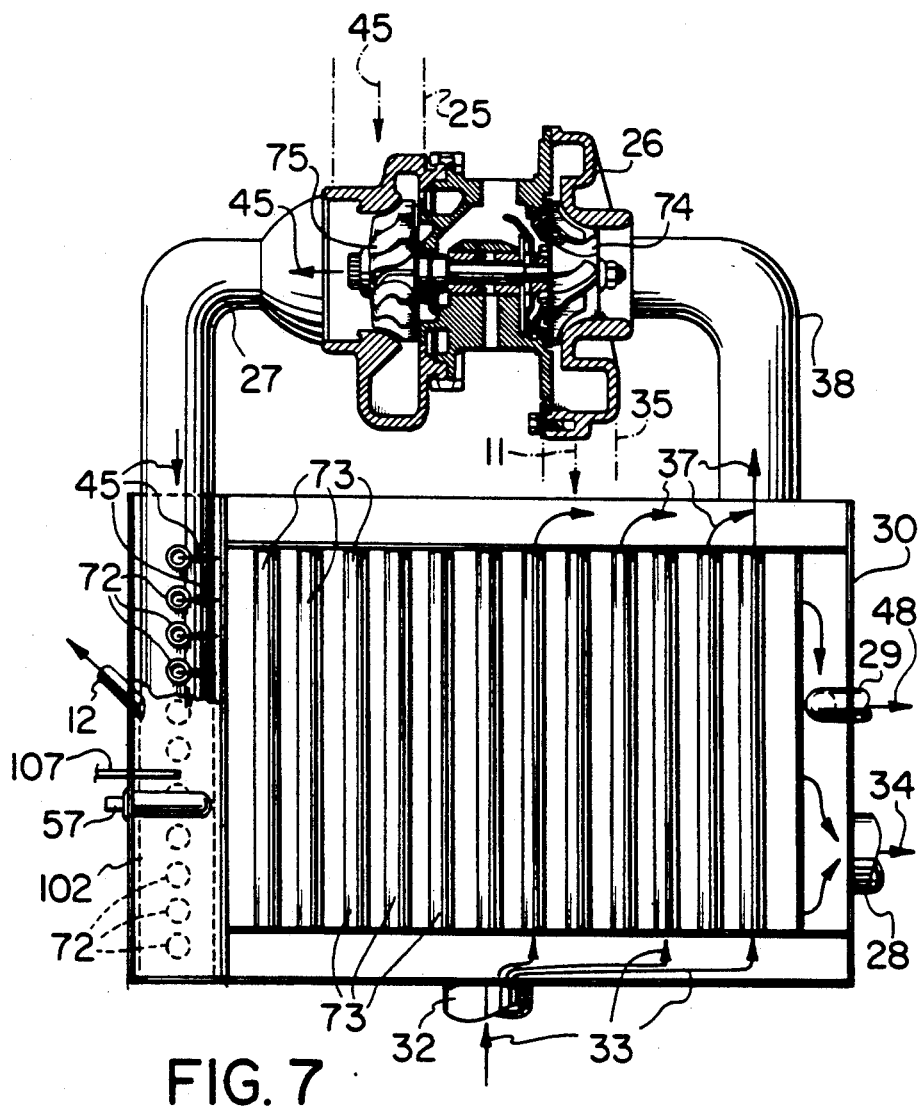
FIG. 7 is a section taken along the line 7—7 of FIG. 1 showing the primary heat exchanger 30, as well as the turbocharger 26; the turbocharger being placed in the approximate position that it would occupy.

The cutting plane KK removes the top of the primary heat exchanger (30) and gives a plan view of the heat exchanger as shown in FIG. 7.

The cutting plane JJ passes through the center of the turbocharger (26), and is viewed from the end of the engine that contains the small camshaft sprocket (71), and is shown as section JJ at the top of the page of diagram FIG. 7. The section JJ of the turbocharger (26) is placed in the approximate position that it would occupy in relation to the primary heat exchanger (30).

It will be recognized by those skilled in the art that embodiments of the invention other than that described herein are well within the scope of the disclosure as defined by the following claims.

What I claim as my invention is:

1. An internal combustion steam engine including at least one power cylinder with a reciprocating piston therein connected to a crankshaft, comprising,
   (a) a means for injecting a mixed fuel/air charge in said power cylinder including a carburettor adapted to provide a homogenous fuel/air mixture at a stoichiometric fuel/air ratio;
   (b) electrical means for igniting said fuel/air charge in said power cylinder;
   (c) a water pump and associated control means for injecting a controlled quantity of water into said cylinder immediately after combustion of said fuel-/air charge such that heat produced by combustion of said fuel/air charge vaporizes said water into steam;
   (d) at least two compound cylinders and means for intaking exhaust gases and steam from said power cylinder, such that, in operation, the compound cylinder pistons are driven by the exhaust gases and steam and wherein subsequent compound cylinder intake ports are connected to prior compound cylinder exhaust ports, and
   (e) exhaust means adapted to cool the exhaust gases and steam so that the steam is condensed to water prior to exhaust gases leaving said exhaust means, said exhaust means including a primary heat exchanger connected by conduit means to an exhaust port of a final compound cylinder and wherein, in operation, exhaust gases including steam are conducted through said primary heat exchanger such that the steam is condensed and the resultant water with absorbed pollutants exits said primary heat exchanger via an exhaust water outlet; and wherein combustion air conduit means are provided to conduct combustion air into and through said primary heat exchanger in which said combustion air is heated by said exhaust gases including steam.

2. An internal combustion steam engine as claimed in claim 1 wherein said exhaust means further includes a turbocharger connected by conduit means to an exhaust port of a final compound cylinder such that, in operation, exhaust gases including steam are conducted to and drive said turbocharger, and wherein said primary heat exchanger is connected by conduit means to an exhaust port of said turbocharger; and wherein secondary combustion air conduit means are provided to conduct said combustion air from said primary heat exchanger to said turbocharger where it is further heated and pressurized.

3. An internal combustion steam engine as claimed in claim 1 further including a secondary heat exchanger and conduit means adapted to conduct a portion of said exhaust gases including steam from said exhaust port of said final compound cylinder to said secondary heat exchanger; and wherein means are provided to conduct predetermined amounts of fuel through said secondary heat exchanger such that, in operation, said fuel is vaporized in said secondary heat exchanger; and wherein said fuel is thereafter mixed with a predetermined volume of combustion air such that a stoichiometric, homogeneous fuel/air mixture is obtained and conducted to one of said power cylinders for combustion therein.

* * * * *